Aug. 28, 1934.     H. F. SCRUBY     1,971,388
BRAKE TESTER
Filed July 5, 1929     3 Sheets-Sheet 1
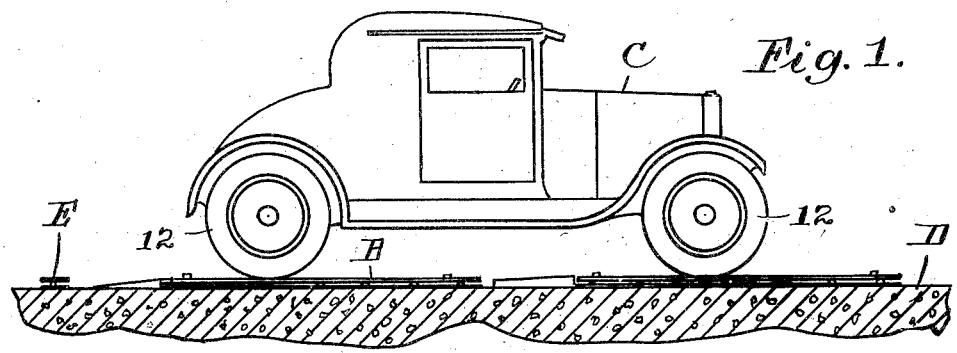
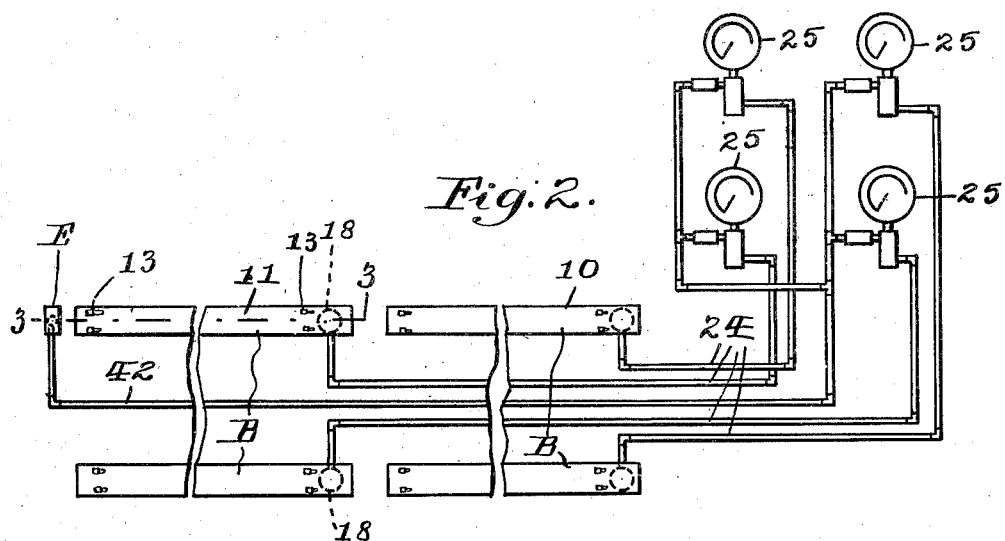
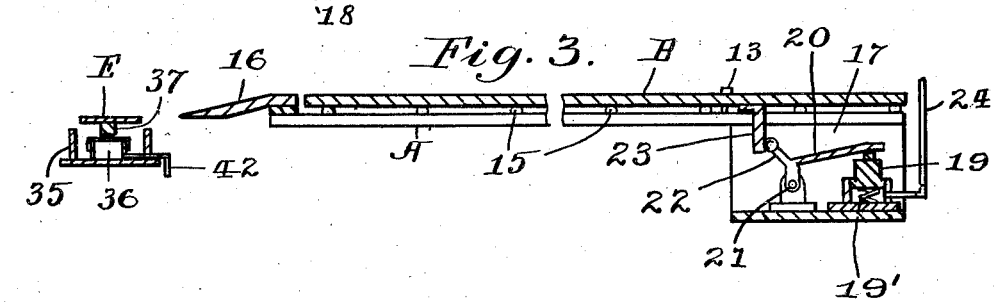
Inventor:
Horace F. Scruby,
by: [signature]
Attorney.

Aug. 28, 1934.  H. F. SCRUBY  1,971,388
BRAKE TESTER
Filed July 5, 1929   3 Sheets-Sheet 2
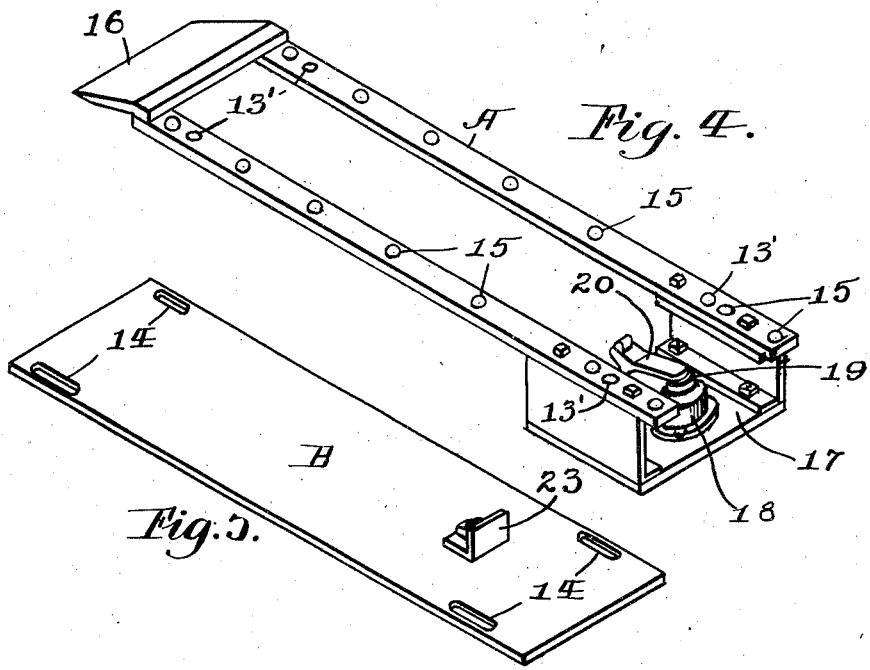
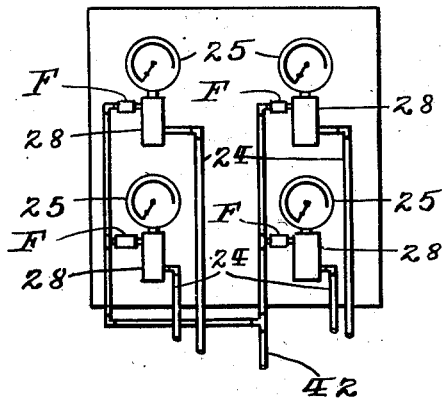
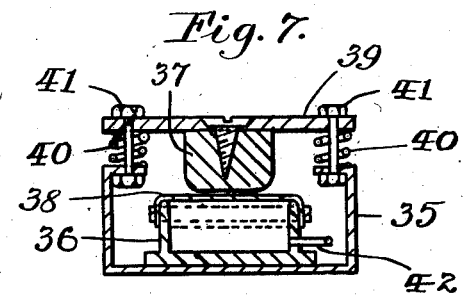
Inventor:
Horace F. Scruby,
by
Attorney.

Aug. 28, 1934.  H. F. SCRUBY  1,971,388
BRAKE TESTER
Filed July 5, 1929  3 Sheets-Sheet 3
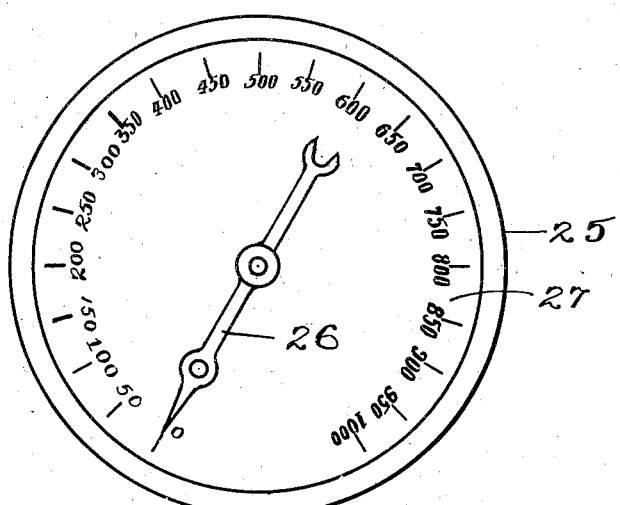
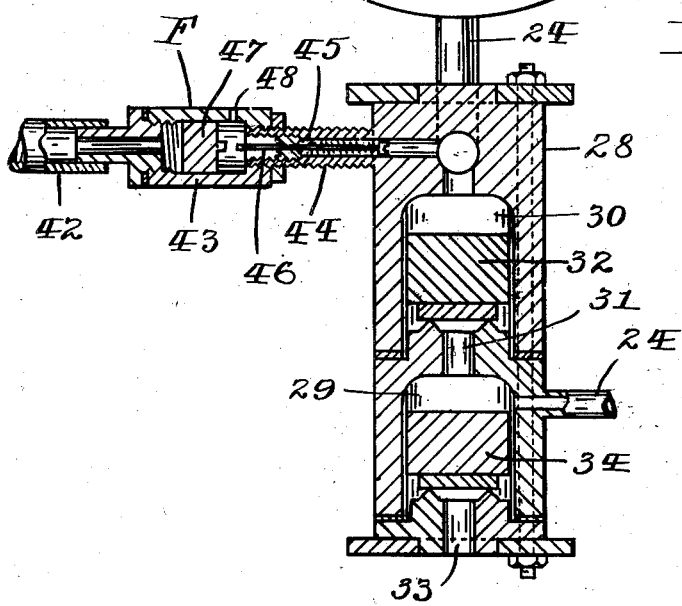
Fig. 8.
Inventor:
Horace F. Scruby.
by: J. G. Bradbury
Attorney.

Patented Aug. 28, 1934

1,971,388

UNITED STATES PATENT OFFICE 1,971,388

BRAKE TESTER

Horace F. Scruby, Los Angeles, Calif.

Application July 5, 1929, Serial No. 376,129

8 Claims. (Cl. 265—47)

This invention relates to brake testers for motor vehicles and more particularly to that class in which an indicator is made to show the efficiency of a brake. The primary object is to provide means for automatically resetting the indicator to zero or starting position through the movement of the vehicle leaving the tester after a test has been made. A further object is to combine with a plurality of brake testers having one tester for each wheel brake of the vehicle, means for automatically resetting all of the indicators to zero or starting position when a test has been made and the vehicle leaves the tester. A still further object is to combine with the features of improvement above noted, simplicity and inexpensive construction and greater effectiveness in use. With these and other objects in view the accompanying illustration shows one form of construction of my invention but it will be understood that the invention can be carried out by other means within the spirit thereof.

In the drawings forming part of this specification, Fig. 1 is a side elevation partly in section showing a car on my improved tester in position to test its brakes; Fig. 2 is a diagrammatic plan of my invention showing four platforms of my improved tester coupled with individual indicators for simultaneously testing four brakes or two brakes, whichever the car may be equipped with and also showing my improved air gauge release; Fig. 3 is an enlarged section taken on the line 3—3 of Fig. 2; Fig. 4 is a perspective view of one of the platform frames; Fig. 5 is a perspective view of the platform used in the frame shown in Fig. 4, said platform as shown being inverted; Fig. 6 is a plan of the instrument panel of the tester showing a set of indicators used with my improved tester mounted thereon; Fig. 7 is an enlarged cross section taken on the line 7—7 of Fig. 2, showing the indicator release; Fig. 8 is an enlarged central vertical section through a control valve, one of which is adapted to be connected with each of the indicators.

In the drawings I have illustrated my improvements applied to a brake tester by the use of which the condition of each individual brake is recorded on an air gauge, constituting an indicator, through the action of a driver in bringing his car to a stop from running condition on the tester. The illustration also shows means for resetting the air gauges to starting position by the action of the driver restarting the car and leaving the tester.

In carrying out my invention in the present embodiment, I provide an elongated skeleton frame A (see Fig. 4), which is adapted to be secured to the surface of the floor D of a building or other structure and upon which is mounted a movable platform B, to produce a track. One of these platforms is provided for each wheel of a vehicle C, to be tested. As shown, four tracks are employed for testing four wheel brakes simultaneously but the same equipment will serve to test two wheel brakes. These platforms are spaced laterally from center to center a distance equal to the average spacing of automobile wheels. For each track two longitudinally spaced platforms are provided, a forward platform 10 and a rearward platform 11. Thus the four platforms B, so provided are adapted to jointly support the four wheels such as 12 of an automobile C so that each wheel of the vehicle is positioned to move upon or to be brought to a stop on, a corresponding platform without effecting the other platforms.

Each platform is movable longitudinally in its frame a short distance, and is held by bolts 13 engaged through holes 13' in the skeleton frame and slots 14 in the platform. Freedom of longitudinal movement is produced by a longitudinal row of ball bearings 15 let into each side of the surface of the frame and interposed between the frame and the lower side of the platform.

This construction permits the structure described being secured to the surface of floor D without providing pits. Short ramps 16 on the ends of the skeleton frame are for the purpose of running the wheels onto the platform without severely jarring the structure. At the forward end of each track structure the skeleton frame is provided with a shallow receptacle 17, in which is secured an air compressor cylinder 18 and a co-acting plunger 19, the latter being depressed by a bell crank 20 which is pivoted at 21, in the receptacle (see Fig. 3), and provided with a roller bearing operated arm 22, with which a depending shoulder 23 on the platform co-operates. Thus as the platform is slid forward by the stopping tendency of a wheel when a brake has been applied, the plunger 19 is depressed and compresses air in the cylinder 18 and immediately upon the wheel coming to rest the air pressure in the cylinder returns the platform to starting position. An individual air pressure line 24 leads from the compressor of each platform to a corresponding pneumatic pressure gauge 25, there being one closed pressure system for each platform, consisting of an air compressor, a pressure gauge line and an air gauge. Each air gauge 25 is of usual form and has a needle indicator 26 which is adapted to indicate on the dial 27, the air pressure produced by the braking tendency transmitted from the corresponding platform of the tester. To accomplish this result the air gauge may be of usual construction whereby the indicator ordinarily will automatically return to zero when the regulating air pressure therein subsides. A suitable valve housing 28 is connected into each pressure line 24 at any selected position and contains lower and upper air chambers 29 and 30, which are connected by a passage 31. Said connecting passage is closed automatically by a check valve 32. The lower air chamber 29 is connected with the portion of said air presure line 24 leading from the corresponding platform air compressor and the upper air chamber 30 is connected by a portion of said line to said air gauge. The lower air chamber 29 has an outside air admission duct 33 which is closed automatically by a check valve 34 from within. The object of these check valves 32 and 34 is to cause compressed air entering from the air pressure line to operate the air gauge and trap the air in the upper compartment 30, thus holding the needle 26 at the highest registered pressure while the compressor piston is returning the platform to starting position after the vehicle has been brought to a stop. In the event of any slight leakage or loss of air from the closed pressure system, a spring 19' forces the plunger 19 up into superior position, which is the starting position of the platform and the check valve 34 replenishes air of atmospheric pressure through the ingress duct 33 into the system. To reset the gauge to zero or starting position after the brakes of a vehicle have been tested by running the vehicle onto the platforms and applying the brakes to stop the wheels from revolving, an air gauge release E is placed in the track of the wheels on one side of the vehicle close to the entering end of the platform. This air gauge release comprises a receptacle 35, which is adapted to be set in the floor D and contains a cylinder 36, which is accompanied by a plunger 37. Said plunger is secured to the lower side of a pressure shoe 39 and said shoe is supported by depressible springs 40 and bolt 41 on said receptacle 35 so that as the vehicle enters or retires from the brake tester its wheels pass over and depress the shoe 39. A diaphragm 38 made out of rubber or other resilient material is secured over the top of the cylinder 36 and as the wheels depress the shoe 39, the plunger 37 depresses the diaphragm and compresses air in the cylinder 36 and the air line 42 leading from the cylinder to each of the valve control devices on the air gauges. Each air gauge controlling device has a check valve release F with which the air line 42 is connected and whose function is to release the trapped air in chamber 30 and permit the air gauge pointer 26 to return automatically to zero or starting position in readiness for another brake testing operation by a vehicle.

The check valve release F comprises a cylinder 43, to one end of which is connected the air line 42. The opposite end of said cylinder is connected with a valve stem 44, the passage through which is connected with the upper end of chamber 30 and contains a check valve 45 acting to automatically check the egress of air from chamber 30. Said check valve has a valve pin 46 against which the inner end of a piston 47 in cylinder 43 is adapted to impinge and open said check valve 45 by an air impulse received from the air gauge release E and allow the escape of air to the outer atmosphere through a vent duct 48, in the wall of cylinder 43 of the air gauge valve release.

The vehicle shown in the drawings is provided with four wheel brakes (not shown), one for each wheel. The methods for testing four wheel brakes are the same as testing two wheel brake cars and I will now describe the operation of the apparatus described and the method for testing the brakes.

The vehicle is driven onto the platforms so that each wheel is rolling over a corresponding platform while the vehicle is moving at a moderate speed. The brakes are then applied so that the car is brought to a stop while each wheel is still on the corresponding platform. As each wheel is acted upon by its brake it exerts a corresponding pull on the corresponding platform. The reading of the gauge then indicates the resistance offered the corresponding wheel by its brake. Each platform is resisted from appreciable movement by the corresponding air compressor and therefore the pressure set up in the corresponding compressor and indicated upon the gauge is indicative of the resistance offered the corresponding wheel by its brake. As the car approaches the platforms the gauge valve release is depressed and opens the valve chamber 30 to the outer atmosphere so that the gauge is in normal or starting position before a test is made. Upon leaving the platforms, the gauge valve release is again automatically operated by the wheels and the gauge released to zero or starting position in readiness for another test.

In accordance with the patent statutes, I have described the principles of operation of my invention together with the construction which I now consider to represent the best embodiment thereof but I desire to have it understood that the apparatus shown is only illustrative and that the invention can be carried out by other means and applied to uses other than those above set forth, within the scope of the following claims:

Having described my invention, what I claim as new and desire to secure by Letters Patent is:

1. In apparatus of the class set forth, a plurality of independently movable platforms relatively disposed to be driven over by a vehicle so that each braked wheel of the vehicle is in contact with the corresponding platform to measure applied forces when the brakes are applied, a plurality of closed air pressure systems each platform having one of said systems resisting longitudinal motion thereof, an air gauge in each of said air pressure systems, a check valve in each of said air pressure systems adapted to trap a portion of the compressed air and hold the indicator of the air gauge at its highest registered position, an auxiliary releasing check valve in the trapped portion of each of said closed air pressure systems, and an auxiliary closed air pressure system associated with the check valves in said air pressure systems and adapted to influence the simultaneous opening thereof, and an actuating element in said auxiliary closed air pressure system adapted to be operated as the vehicle is driven off of the platforms.

2. In apparatus of the class set forth, a plurality of independently movable platforms relatively disposed to be driven over by a vehicle so that each braked wheel thereof is in contact with a corresponding platform to measure applied forces when the brakes are applied, an independent closed air pressure system for each platform each system being separate from the others and resisting longitudinal motion of the companion platforms, an air gauge in each closed air pressure system, a check valve in each closed air pressure system adapted to trap a portion of the compressed air therein and hold the indicator of the companion air gauge at its highest registered position, an auxiliary releasing check valve in the trapped portions of said closed air pressure system, an auxiliary closed air pressure system, actuating elements in said auxiliary closed air pressure system adapted to open said auxiliary check valves and release said trapped compressed air to return the indicators to normal indicating position, and an air compressing element in said auxiliary closed air pressure system disposed to be operated as the vehicle is driven off of the platforms to effect the release of said auxiliary check valves.

3. In apparatus of the class set forth, a horizontally movable platform disposed to be driven over by a vehicle wheel, an air pressure system associated with said platform resisting longitudinal motion thereof, an air gauge in said air pressure system, a check valve in said system adapted to trap a portion of the compressed air and hold the indicator of said air gauge at its highest registered position, an auxiliary releasing check valve in the trapped portion of said closed air pressure system, and an auxiliary closed air pressure system associated with the check valve in said air pressure system and adapted to influence the opening thereof, and means actuated by said wheel as the vehicle is driven off of said platform for effecting the operation of said auxiliary check valve and causing the return of said gauge into normal pressure indicating position.

4. In apparatus of the class set forth, a horizontally movable platform disposed to be driven over by a vehicle wheel, a closed air pressure system associated with said platform resisting longitudinal motion thereof, an air gauge in said air pressure system, a check valve in said system adapted to trap a portion of the compressed air and hold the indicator of said air gauge at its highest registered position, an auxiliary releasing check valve in the trapped portion of said closed air pressure system, and an auxiliary closed air pressure system associated with the check valve in said air pressure system and adapted to influence the opening thereof, and fluid influenced means actuated by said wheel as the vehicle is driven off of said platform for effecting the operation of said auxiliary check valve and causing the return of said air gauge into normal pressure indicating position.

5. In apparatus of the class set forth, a horizontally movable platform disposed to be driven over by a vehicle wheel, a closed air pressure system associated with said platform and resisting longitudinal motion thereof, an air gauge in said air pressure system, a check valve in said system adapted to trap a portion of the compressed air and hold the indicator of said air gauge at its highest registered position, an auxiliary releasing check valve in the trapped portion of said closed air pressure system, an auxiliary closed air pressure system associated with the check valve in said air pressure system and containing an impulse device in position to be applied by said wheel as the vehicle is driven off of said platform and effect the return of the air gauge into normal indicating position.

6. In apparatus of the class set forth, a plurality of independently movable platforms relatively disposed to be driven over by a vehicle so that each braked wheel thereof is in contact with a corresponding platform to measure applied forces when the brakes are applied, an independent air pressure system for each platform each system being separate from the others and resisting longitudinal motion of the companion platforms, an air gauge in each closed air pressure system, a check valve in each closed air pressure system adapted to trap a portion of the compressed air at the highest registered position of the companion air gauge, an auxiliary releasing check valve in the trapped portions of said closed air pressure systems, an auxiliary closed air pressure system associated with the check valves in said air pressure systems and adapted to influence the simultaneous opening thereof, actuating devices for opening said auxiliary releasing check valve and releasing said trapped compressed air to return the indicators to normal indicating position, and an impulse device disposed to be operated as the vehicle is driven off of the platforms to effect the release of said auxiliary check valve.

7. In a vehicle-wheel brake-tester, the combination of a movably-mounted traction-plate over which a vehicle-wheel is adapted to roll and to be moved due to the application of the brake to the wheel, means to resist such movement of the plate, an indicator designed to show the extent of movement of the plate and hence the degree of braking action on the wheel, means to actuate said indicator by said movement of said plate, means to retain said indicator in such showing relation, another plate over which a wheel of the vehicle is designed to roll, and means operated by the wheel when on said second plate to release said indicator retaining means to restore said indicator to its original position ready for its next actuation.

8. In a vehicle-wheel brake-tester, the combination of a plurality of movably-mounted traction-plates over which the wheels of a vehicle are adapted to roll individually and to be moved due to the application of the brakes to the wheels, means to resist such movements of the plates, indicators adapted to show individually the degree of braking action on the wheels, means to actuate said indicator by said movements of said plates, means to retain said indicators in registering relation, another plate over which a wheel of the vehicle is designed to roll, and means operated by said last-mentioned plate to release all of said indicator retaining means to allow restoration of all of said indicators to their original positions ready for their next actuations.

HORACE F. SCRUBY.